United States Patent [19]
Matsuda

[11] Patent Number: 5,274,321
[45] Date of Patent: Dec. 28, 1993

[54] BATTERY CHARGER

[75] Inventor: Toshio Matsuda, Tokyo, Japan

[73] Assignee: Sony Corporation, Japan

[21] Appl. No.: 819,978

[22] Filed: Jan. 13, 1992

[30] Foreign Application Priority Data

Jan. 18, 1991 [JP] Japan ............................. 3-001154[U]
Jan. 21, 1991 [JP] Japan ............................. 3-001237[U]

[51] Int. Cl.⁵ ............................................. H02J 7/04
[52] U.S. Cl. .............................. 320/31; 320/37; 320/48
[58] Field of Search .................... 320/31, 37, 38, 48

[56] References Cited

U.S. PATENT DOCUMENTS

| | | | |
|---|---|---|---|
| 4,131,841 | 12/1978 | Bennefeld | 320/23 |
| 4,191,918 | 3/1980 | Nicholls | 320/37 X |
| 4,647,834 | 3/1987 | Castleman | 320/43 |
| 4,820,965 | 4/1989 | Siemer | 320/31 |
| 4,992,720 | 2/1991 | Hata | 320/31 X |

FOREIGN PATENT DOCUMENTS

0100753 2/1984 European Pat. Off. .
0406858 1/1991 European Pat. Off. .

Primary Examiner—R. J. Hickey
Attorney, Agent, or Firm—Ronald P. Kananen

[57] ABSTRACT

A battery charger is disclosed comprising a pair of charging terminals to which a secondary battery may be connected, a power source for supplying the charging terminals with a charging voltage, a recharging detector for detecting the degree of recharging on the secondary battery on the strength of the voltage between the charging terminals, and a timer operative to measure a predetermined time beginning when the recharging detector detects that the degree of recharging on the second battery has reached a predetermined degree set within a range from seventy percent to ninety percent of full recharging. The invention further includes a first recharging indicator, for example an LED, which indicates that the secondary battery is being charged up until the timing operation commences. Once the timing operation begins, a second recharging indicator, for example a differently colored LED, indicates that the secondary battery has been charged to the predetermined degree and is receiving a final charge during the timing operation.

10 Claims, 3 Drawing Sheets

BATTERY CHARGER

FIELD OF THE INVENTION

The present invention relates generally to battery chargers used for recharging a secondary battery, and more particularly, to a battery charger suitable for recharging a secondary battery of relatively small size and widely used for providing a power source for an electronic apparatus.

DESCRIPTION OF THE PRIOR ART

There has been proposed a battery charger which contains a direct current (hereinafter, referred to as DC) power source for supplying a DC power obtained by rectifying an alternating current (hereinafter, referred to as AC) power from a commercial AC power source, and by which a secondary battery, such as a so-called Nickel-Cadmium battery, connected thereto to be recharged is supplied with a charging current from the DC power source. In the recharging of the secondary battery, it is usual to arrange the charging current supplied to flow through the secondary battery from the DC power source in the battery charger to have a relatively large level so as to reduce charging time on the secondary battery until the degree of recharging on the secondary battery reaches, for example, eighty percent of full recharging and to have a relatively small level so as to avoid recharging the secondary battery in excess after the degree of recharging has reached eighty percent of full charge.

Accordingly, during the recharging of the secondary battery, the degree of recharging on the secondary battery does not increase linearly in proportion to the lapse of charging time to reach a hundred percent, but increases linearly in proportion to the lapse of charging time to reach about eight percent and then further increases slowly to a hundred percent with a gradient more gentle than that going toward about eighty percent.

In the case where the secondary battery which is recharged as mentioned above is in process of recharging, it should be prevented from the secondary battery should be prevented from discharging before the degree of recharging reaches eighty percent of full charging because it is possible that the secondary battery maybe damaged in function irrecoverably by discharging with the degree of recharging less than eighty percent of full charging. However, after the degree of recharging has reached eighty percent of full charging, the secondary battery may be used for providing a power source before the recharging is completed because the secondary battery does not suffer irrecoverable damage in function through discharging with the degree of recharging more than eighty percent of full charging.

There is a need for a battery, charger by which the secondary battery recharged in such a manner described above, which can indicate appropriately the degree of recharging on the secondary battery at any moment when the secondary battery is actually recharged. Further, there is a need to provide an indication with which it can be easily checked whether or not the secondary battery, engaged in the process of recharging, is in a condition wherein the degree of recharging has reached eighty percent of full recharging, as well as another indication with which it can be easily checked whether or not the secondary battery, engaged in the process of recharging, is in a condition wherein the degree of recharging has reached a hundred percent of full recharging after having passed through eighty percent. It is also desirable for the battery charger to recharge effectively the secondary battery during a period in which the degree of recharging on the secondary battery increases toward eighty percent and during another period in which the degree of recharging on the secondary battery increases from eighty percent toward a hundred percent.

Further, in the case of the battery charger which operates not only to recharge the secondary battery as described above but also to supply a load, such as a compact electronic apparatus, connected across the secondary battery with operation power, there is a need, in addition to those mentioned above, to cause the charging current which flows through the secondary battery from the DC power source to be substantially constant regardless of variations in a current supplied to the load from the DC power source.

However, none of the previously proposed battery chargers, especially those for recharging the secondary battery of small size used for a portable telephone apparatus or the like, complies with such needs, as described above, in a relatively simple configuration.

OBJECTS AND SUMMARY OF THE INVENTION

Accordingly, it is an object of the present invention to provide a battery charger which can meet the aforementioned needs.

Another object of the present invention is to provide a battery charger which is suitable for recharging a secondary battery of relatively small size used for providing a power source for an electronic apparatus, and by which the degree of recharging on the secondary battery is so indicated that it is easily checked whether the secondary battery can be used appropriately for providing a power source or not.

A further object of the present invention is to provide a battery charger which is suitable for recharging a secondary battery of relatively small size used for providing a power source for an electronic apparatus, and by which the secondary battery is effectively recharged at any moment in response to the degree of recharging on the secondary battery.

A still further object of the present invention is to provide a battery charger which is operative to recharge a secondary battery of relatively small size used for providing a power source for an electronic apparatus and to supply a load connected across the secondary battery with operation power, by which a charging current supplied to flow through the secondary battery from a DC power source provided therein is caused to be substantially constant, regardless of variations in a current supplied to the load from the DC power source, under a relatively simple configuration.

According to the present invention, there is provided a battery charger which comprises a pair of charging terminals to which both end terminals of a secondary battery are connected, respectively, a power source for supplying the secondary battery connected to the charging terminals with a charging current, a recharging detector for detecting the degree of recharging on the secondary battery to which the charging current is supplied from the power source on the strength of a voltage between the charging terminals, a timer operative to start a time measuring operation when it is detected by the recharging detector that the degree of recharging on the second battery supplied with the charging current from the power source has reached a predetermined degree set within a range from seventy percent to ninety percent of full recharging and to continue the time measuring operation to measure a predetermined time, a first recharging indicator operative to have indications different from each other in a first period from a time point at which the charging current is begun to be supplied to the secondary battery connected to the charging terminals to a time point at which the time measuring operation is started by the timer and in each of periods allocated before and after the first period, and a second recharging indicator operative to have indications different from each other in a second period in which the timer performs the time measuring operation and in each of periods allocated before and after the second period.

In one embodiment of battery charger according to the present invention, the power source is operative to perform substantially as a constant current source for supplying the secondary battery with the charging current in the first period from the time point at which the charging current is begun to be supplied to the secondary battery to the time point at which the time measuring operation is started by the timer and further to perform substantially as a constant voltage source for supplying the secondary battery with the charging current in the second period in which the timer performs the time measuring operation.

In another embodiment of battery charger according to the present invention, a resistor is connected in series with the secondary battery between the charging terminals and a voltage controller to which a voltage obtained across the resistor is supplied is provided for causing the power source to supply the secondary battery with the charging current so that the voltage obtained across the resistor is kept substantially constant.

With the battery charger thus constituted in accordance with the present invention, the first and second recharging indicators contain, for example, first and second light emitting devices each operative to emit light different in color from each other, respectively. The first recharging indicator causes the first light emitting device to emit the light in a first manner in the first period from the time point at which the charging current is begun to be supplied to the secondary battery connected to the time point at which the time measuring operation is started by the timer, in other words, in a restricted period in which the secondary battery is in process of recharging with the degree of recharging increasing to go toward the predetermined degree set within the range from seventy percent to ninety percent of full recharging and therefore should be restricted from discharging for providing a power source, and causes also the first light emitting device to emit the light in a second manner different from the first manner in each of the periods allocated before and after the restricted period. Then, the second recharging indicator causes the second light emitting device to emit the light in a third manner in the second period in which the timer performs the time measuring operation, in other words, in an unrestricted period in which the secondary battery is still in the process of recharging with the degree of recharging further increasing toward a hundred percent of full recharging after having passed through the predetermined degree set within the range from seventy percent to ninety percent of full recharging and therefore may be used for providing a power source, and causes also the second light emitting device to emit the light in a fourth manner different from the third manner in each of the periods allocated before and after the unrestricted period.

This results in that a situation in which the secondary battery is recharged in the restricted period and a situation in which the secondary battery is recharged in the unrestricted period are clearly and appropriately indicated by the first and second recharging indicators. Each of the first and second recharging indicators is caused to stop its operation by putting the secondary battery out of the charging terminals after the degree of recharging on the secondary battery has reached a hundred percent of full charge.

According to this embodiment of the present invention, the secondary battery is recharged with the charging current supplied from the power source which performs substantially as a constant current source in the first or restricted period in which the secondary battery is in the process of recharging with the degree of recharging increasing toward the predetermined degree set within the range from seventy percent to ninety percent of full recharging and further recharged with the charging current supplied from the power source which performs substantially the constant voltage source in the second or unrestricted period in which the secondary battery is in process of recharging with the degree of recharging increasing to go toward a hundred percent of full recharging after having passed through the predetermined degree set within the range from seventy percent to ninety percent of full recharging. Therefore, each recharging of the second battery, with the degree of recharging increasing toward the predetermined degree set within the range from seventy percent to ninety percent of full recharging, and the recharging of the second battery with the degree of recharging increasing toward a hundred percent of fully recharging after having passed through the predetermined degree, is conducted with improved efficiency.

Further, with the other embodiment of battery charger according to the present invention, the charging current flowing through the secondary battery and the resistor connected in series between the charging terminals is controlled so as to be substantially constant by the voltage controller. Such a constant charging current is maintained even under a condition in which a load, such as a portable telephone, is connected in parallel with the series connection of the secondary battery and the resistor between the charging terminals, regardless of variations in a current supplied to the load from the power source. Accordingly, the secondary battery is appropriately recharged with the constant charging current supplied from the power source, under a relatively simple configuration, even when the load connected in parallel with the secondary battery and the resistor is supplied by the power source with the current varying in accordance with the load.

The above, and other objects, features and advantages of the present invention will be come apparent from the following detailed description which is to be read in conjunction with the accompanying drawings.

DESCRIPTION OF THE PREFERRED EMBODIMENTS

Figure 1:
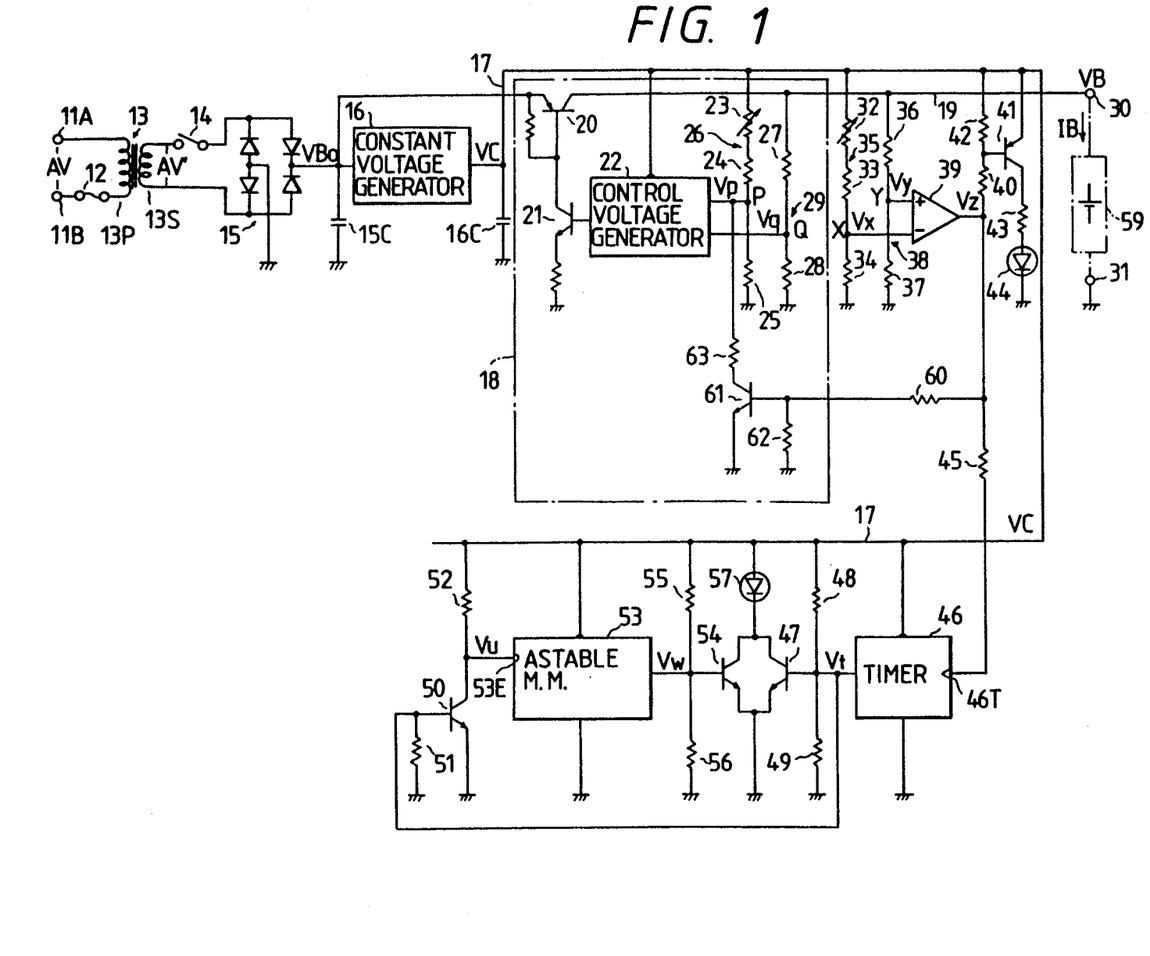
FIG. 1 is a circuit diagram showing an embodiment of battery charger according to the present invention.

FIG. 1 shows an embodiment of battery charger according to the present invention, which is constituted to be suitable for recharging a so-called Lithium-ion battery which is one of secondary batteries and used for providing a power source for an electronic apparatus, such as a portable telephone.

Referring to FIG. 1, a pair of power source input terminals 11A and 11B are provided and an AC voltage AV is supplied from a commercial AC power source between the power source input terminals 11A and 11B. The AC voltage AV is subjected to voltage-transformation by a transformer 13 which has a primary winding 13P connected through a fuse 12 with the power source input terminals 11A and 11B and a secondary winding 13S from which a reduced AC voltage AV' is obtained.

The reduced AC voltage AV' obtained from the secondary winding 13S of the transformer 13 is supplied through a power source switch 14 to a full-wave rectifier 15. In the full-wave rectifier 15, the reduced AC voltage AV' is rectified to produce a DC voltage VBo, and the DC voltage VBo is obtained across a capacitor 15C to be supplied to both a constant voltage generator 16 and a voltage stabilizing circuit 18. The constant voltage generator 16 produces based on the DC voltage VBo a constant power source voltage VC having a constant level of, for example, 5 volts which is not influenced by variations in level of the DC voltage VBo. The constant power source voltage VC is obtained across a capacitor 16C connected to the output terminal of the constant voltage generator 16 to be transmitted through a power source line 17.

The voltage stabilizing circuit 18 comprises a PNP transistor 20 formed into the common base configuration and supplied with the DC voltage VBo from the capacitor 15C, an NPN transistor 21 connected between the base of the PNP transistor 20 and a grounded point to be formed into the common emitter configuration, a control voltage generator 22 having its output terminal connected to the base of the NPN transistor 21, a voltage detector 26 including a series connection of a variable resistor 23 and resistors 24 and 25 provided between the power source line 17 and the grounded point and having a connecting point P formed between the resistors 24 and 25 and connected with one of input terminals of the control voltage generator 22, and a voltage detector 29 including a series connection of resistors 27 and 28 provided between the power source line 19 and the grounded point and having a connecting point Q formed between the resistors 27 and 28 and connected with the other of input terminals of the control voltage generator 22.

The collector of the PNP transistor 20 in the voltage stabilizing circuit 18 is connected through a power source line 19 extending therefrom with a charging terminal 30. A portion including the full-wave rectifier 15 and the voltage stabilizing circuit 18 forms a power source circuit portion for supplying the charging terminal 30 with a stabilized power source voltage as a charging voltage VB. The charging terminal 30 makes a pair with another charging terminal 31, which is grounded.

A battery 59 which is, for example, a Lithium-ion battery to be recharged is connected between the charging terminals 30 and 31. The charging voltage VB obtained through the power source line 19 at the charging terminal 30 is applied to the battery 59 and thereby a charging current IB flows through the battery 59 so that the battery 59 is recharged with the charging current IB.

In the control voltage generator 22 provided in the voltage stabilizing circuit 18, a voltage Vq, obtained at the connecting point Q in the voltage detector 29 by dividing the charging voltage VB applied from the power source line 19, is compared with a voltage Vp obtained at the connecting point P in the voltage detector 26 by dividing the constant power source voltage VC applied from the power source line 17 to produce a control voltage having its level corresponding to a difference between the voltage Vq and the voltage Vp. The control voltage thus produced is supplied to the base of the NPN transistor 21 so as to control through the NPN transistor 21 the impedance of the PNP transistor 20. With such a control of the impedance of the PNP transistor 20, the voltage stabilizing circuit 18 performs as a constant voltage generating circuit and the charging voltage VB which is obtained at the collector of the PNP transistor 20 and transmitted through the power source line 19 to the charging terminal 30 is controlled to have a constant level of, for example, 8.1 volts. In such a case, the difference between the voltage Vq and the voltage Vp is controlled to be constant. Since the voltage Vp is obtained by dividing the constant power source voltage VC in the ratio of the resistance value of the resistor 25 to the sum of resistance values of the variable resistor 23 and the resistors 24 and 25 and thereby has a constant level, the voltage Vq is controlled also to have a constant level and a current flowing through the PNP transistor 20 is so controlled that the charging current IB supplied through the power source line 19 to the battery 59 is controlled to be constant. The level of the voltage Vp is adjusted by the variable resistor 23.

A voltage detector 35 comprising a variable resistor 32 and resistors 33 and 34, which forms a voltage divider for dividing the constant power source voltage VC, and having a connecting point X between the resistors 33 and 34 connected with a negative input terminal of a level comparator 39 is provided between the power source line 17 and the grounded point. Further, a voltage detector 38 comprising resistors 36 and 37, which forms a voltage divider for dividing the stabilized power source voltage obtained from the transistor 20 and applied to the charging terminal 30 as the charging voltage VB, and having a connecting point Y between the resistors 36 and 37 connected with a positive input terminal of the level comparator 39 is provided between the power source line 19 and the grounded point. In the level comparator 39, a voltage Vy which is obtained at the connecting point Y of the voltage detector 38 by dividing the charging voltage VB in the ratio of the resistance value of the resistor 37 to the sum of resistance values of the resistors 36 and 37 is compared with a voltage Vx obtained at the connecting point X of the level detector 35 by dividing the constant power source voltage VC in the ratio of the resistance value of the resistor 34 to the sum of resistance values of the variable resistor 32 and the resistors 33 and 34, and a comparison output voltage Vz which has a low level when the voltage Vy is smaller in level than the voltage Vx and a high level when the voltage Vy is equal in level to or larger in level than the voltage Vx is produced.

The voltage Vx obtained at the connecting point X of the voltage detector 35 is adjusted in level by the variable resistor 32 so as to have a constant level which corresponds to the level of the voltage Vy obtained at the connecting point Y of the voltage detector 38 when the charging voltage VB is, for example, 7.8 volts. Since the level of the voltage Vx is thus adjusted, the comparison output voltage Vz has the low level when the level of the charging voltage VB obtained from the power source line 19 is smaller than 7.8 volts and the high level when the level of the charging voltage VB is equal to or larger than 7.8 volts.

The comparison output voltage Vz obtained from the level comparator 39 is supplied through a resistor 40 to a PNP transistor 41. The PNP transistor 41 has its base connected through a resistor 42 with the power source line 17, its emitter connected with the power source line 17, and its collector connected through a resistor 43 and a light emitting diode 44 connected in series with the grounded point. The PNP transistor 41 is put in an ON state when the comparison output voltage Vz obtained from the level comparator 39 has the low level and in an OFF state when the comparison output voltage Vz obtained from the level comparator 39 has the high level. The light emitting diode 44 connected through the resistor 43 with the collector of the PNP transistor 41 is caused to be in the ON state only when the PNP transistor 41 is in the ON state and operative to emit, for example, red light under the ON state. The PNP transistor 41 and the light emitting diode 44 constitute a first recharging indicator.

The comparison output voltage Vz obtained from the level comparator 39 is also supplied through a resistor 45 to a trigger terminal 46T of a timer 46 to which the constant power source voltage VC is supplied from the power source line 17. The timer 46 is triggered by a rising edge of the comparison output voltage Vz supplied to the trigger terminal 46T to start a time measuring operation for measuring a predetermined time, and then, is automatically reset when the predetermined time has been measured. From the timer 46, a timer output voltage Vt having a high level when the time measuring operation is not performed and a low level when the time measuring operation is performed is obtained.

The timer output voltage Vt obtained from the timer 46 is supplied to a base of an NPN transistor 47. The NPN transistor 47 has its base connected through a resistor 48 with the power source line 17 and further connected through a resistor 49 with the grounded point, its emitter grounded directly, and its collector connected through a light emitting diode 57 with the power source line 17. The NPN transistor 47 is put in an ON state when the timer output voltage Vt has a high level and on an OFF state when the timer output voltage Vt has a low level.

The timer output voltage Vt obtained from the timer 46 is also supplied to a base of an NPN transistor 50. The NPN transistor 50 has its base connected through a resistor 51 with the grounded point, its emitter grounded directly, and its collector connected through a resistor 52 with the power source line 17. The NPN transistor 50 is put in an ON state when the timer output voltage Vt has the high level and in an OFF state when the timer output voltage Vt has the low level. An output voltage Vu appearing at the collector of the NPN transistor 50 to have a low level when the NPN transistor 50 is in the ON state and a high level when the NPN transistor 50 is in the OFF state, is supplied to an enable terminal 53E of an astable multivibrator (astable M.M.) 53 to which the constant power source voltage VC is applied from the power source line 17.

The astable multivibrator 53 does not perform a level inverting operation thus an output voltage Vw obtained at an output terminal thereof has a low level continuously when the output voltage Vu supplied to the enable terminal 53E has the low level, and performs the level inverting operation to cause the output voltage Vw obtained at the output terminal thereof to have a high level and the low level alternately every predetermined period set by a time constant circuit contained in the astable multivibrator 53 when the output voltage Vu supplied to the enable terminal 53E has the high level. The output voltage Vw from the astable multivibrator 53 is supplied to a base of an NPN transistor 54. The NPN transistor 54 has its base connected through a resistor 55 with the power source line 17 and further connected through a resistor 56 with the grounded point, its emitter grounded directly, and its collector connected to a connecting point between the collector of the NPN transistor 47 and the light emitting diode 57. The NPN transistor 54 is put in an ON state when the output voltage Vw from the astable multivibrator 53 has the high level and in an OFF state when the output voltage Vw from the astable multivibrator 53 has the low level.

The light emitting diode 57 connected between the power source line 17 and each of the collectors of the NPN transistors 47 and 54 is put in an ON state to emit, for example, green light when at least one of the NPN transistors 47 and 54 is put in the ON state. These NPN transistors 47 and 54 and the light emitting diode 57 constitute a second recharging indicator.

Further, the comparison output voltage Vz obtained from the level comparator 39 is supplied through a resistor 60 with a base of an NPN transistor 61. The NPN transistor 61 has its base connected through a resistor 62 with the power source line 17, its emitter grounded directly, and its collector connected through a resistor 63 with the connecting point P of the voltage detector 26 in the voltage stabilizing circuit 18. The NPN transistor 61 is put in an OFF state when the comparison output voltage Vz has the low level and in an ON state when the comparison output voltage Vz has the high level.

Figure 2A:
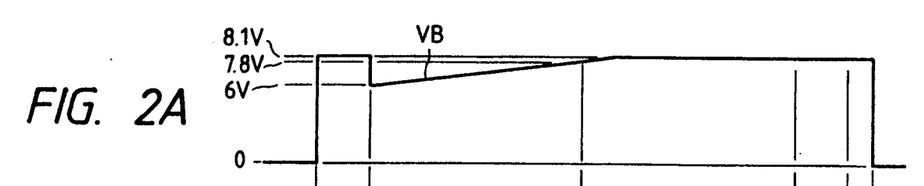
FIGS. 2A to 2H are waveform diagrams used for explanation of the embodiment shown in FIG. 1.

When the battery 59 is recharged by the battery charger constituted as described above in accordance with the present invention, first, the power source switch 14 is turned on at a time point t1 as shown in FIGS. 2A to 2H under a condition in which the AC voltage AV from the commercial AC power source is supplied between the power source input terminals 11A and 11B, so that the constant power source voltage VC of, for example, 5 volts is obtained on the power source line 17 and the charging voltage VB of, for example, 8.1 volts, as shown in FIG. 2A, is obtained on the power source line 19 just after the time point t1.

Figure 2B:
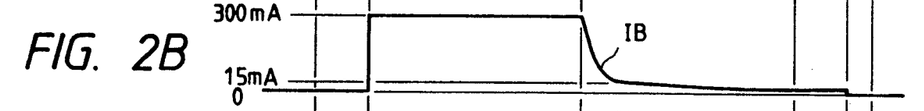
Figure 2C:
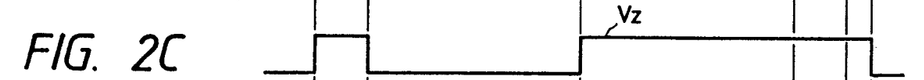
Figure 2D:
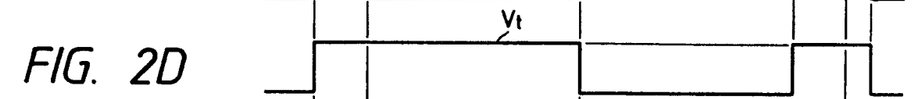
Figure 2E:
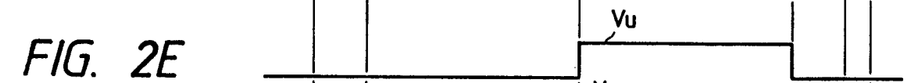
Figure 2F:
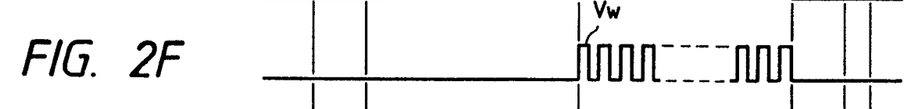
Figure 2G:
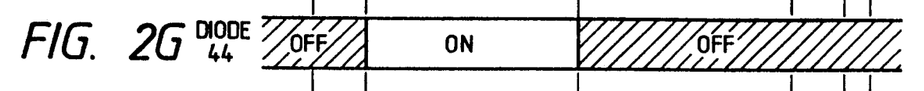
Figure 2H:
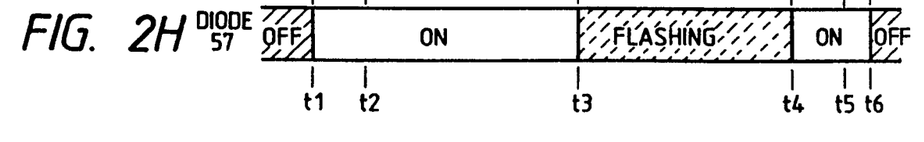

On that occasion, since the comparison output voltage Vz obtained from the level comparator 39 has the high level, as shown in FIG. 2C, the light emitting diode 44 is put in the OFF state, as shown in FIG. 2G. On the other hand, since the timer 46 is put in a condition not to perform the time measuring operation and the timer output voltage Vt obtained from the timer 46 has the high level, as shown in FIG. 2D, the NPN transistor 47 is put in the ON state and thereby the light emitting diode 57 is also put in the ON state, as shown in FIG. 2H, to emit green light.

Then, the battery 59 which is to be recharged is connected between the charging terminals 30 and 31 at a time point t2 as shown in FIGS. 2A to 2H. The charging current IB of, for example, 300 milliamperes as shown in FIG. 2B, is supplied through the power source line 19 to the battery 59 and thereby the charging voltage VB is suddenly dropped to, for example, 6 volts at the time point t2, as shown in FIG. 2A. After the time point t2, the charging voltage VB on the power source line 19 increases gradually with increase in the degree of recharging on the battery 59, as shown in FIG. 2A. Under such a condition, the power source circuit portion comprising the full-wave rectifier 15 and the voltage stabilizing circuit 18 performs substantially as a constant current source and the charging current IB supplied through the power source line 19 to the battery 59 is caused to have a constant level, as shown in FIG. 2B. Consequently, the recharging of the battery 59 under a situation in which the charging voltage VB increases linearly is carried out with improved efficiency.

In the step of recharging of the battery 59 as described above, the level of the charging voltage VB is bounded to be lower than 7.8 volts which corresponds to a predetermined degree of recharging on the battery 59 set within the range from ninety percent of full recharging, for example, eighty percent of full recharging. That is, the charging voltage VB on the power source line 19 is arranged to have the level of 7.8 volts when the degree of recharging on the battery 59 which is recharged with the charging current IB supplied thereto through the power source line 19 has reached eighty percent of full recharging.

Then, since the charging voltage VB is bounded in level to be lower than 7.8 volts, the voltage Vy obtained at the connecting point Y in the voltage detector 38 is lower in level than the voltage Vx obtained at the connecting point X in the voltage detector 35 and the comparison output voltage Vz obtained from the level comparator 39 has the low level, as shown in FIG. 2C. Therefore, the PNP transistor 41 is put in the ON state and thereby the light emitting diode 44 is also put in the ON state to emit red light, as shown in FIG. 2G. Further, since the timer 46 is put continuously in the condition not to perform the time measuring operation so that the timer output voltage Vt from the timer 46 has the high level, as shown in FIG. 2D, the NPN transistor 47 is put in the ON state and thereby the light emitting diode 57 is also put in the ON state to emit green light, as shown in FIG. 2H.

The NPN transistor 61 connected with the connecting point P in the voltage detector 26 provided in the voltage stabilizing circuit 18 is put continuously in the OFF state because the comparison output voltage Vz from the level comparator 39 has the low level.

Accordingly, when the charging voltage VB on the power source line 19 is bounded in level to be lower than 7.8 volts after the recharging of the battery 59 has been started, namely, when the degree of recharging on the battery 59 has not reached eighty percent of full recharging, the light emitting diodes 44 and 57 emit continuously red light and green light, respectively, so that it is appropriately indicated that the battery 59 should be restrained from discharging to provide a power source for an electronic apparatus.

After that, the level of the charging voltage VB on the power source line 19 has reached 7.8 volts and the degree of recharging on the battery 59 has reached eighty percent of full recharging at a time point t3, as shown in FIGS. 2A to 2H. Then, after the time point t3, the level of the charging voltage VB on the power source line 19 increases gradually to go toward 8.1 volts from 7.8 volts, as shown in FIG 2A.

In such a case, since the level of the charging voltage VB is higher than 7.8 volts, the voltage Vy obtained at the connecting point Y in the voltage detector 38 is equal in level to or higher in level than the voltage Vx obtained at the connecting point X in the voltage detector 35 and the comparison output voltage Vz obtained from the level comparator 39 has a rising edge to the high level from the low level at the time point t3, as shown in FIG. 2C. Therefore, the NPN transistor 61 connected with the connecting point P in the voltage detector 26 provided in the voltage stabilizing circuit 18 is put in the ON state so that the voltage Vp obtained at the connecting point P in the voltage detector 26 is reduced in level. Consequently, the PNP transistor 20, which is controlled by the control voltage supplied thereto from the control voltage generator 22, controls the charging current IB supplied through the power source line 19 to the battery 59 to have its level reduced suddenly to be, for example, 15 milliamperes, as shown in FIG. 2B. Under such a condition, the power source circuit portion comprising the full-wave rectifier 15 and the voltage stabilizing circuit 18 performs substantially as a constant voltage source and the battery 59 is further recharged effectively with the charging current IB suddenly reduced in level and the degree of recharging on the battery 59 further increases gradually to go toward a hundred percent of full recharging.

Since the comparison output voltage Vz obtained from the level comparator 39 has the rising edge to the high level from the low level at the time point t3, as shown in FIG. 2C, the PNP transistor 41 is turned into the OFF state and thereby the light emitting diode 44 is also turned into the OFF state not to emit red light.

While, the timer 46 is triggered by the rising edge of the comparison output voltage Vz obtained from the level comparator 39 at the time point t3 to start the time measuring operation for measuring a predetermined time. The predetermined time measured by the timer 46 is set to correspond to a period in which the degree of recharging on the battery 59 reaches a hundred percent of full recharging after having passed through eighty percent of full recharging. With such time measuring operation by the timer 46, the timer output voltage Vt obtained from the timer 46 has the low level continuously after the time point t3, as shown in FIG. 2D, and thereby the NPN transistor 47 is turned into the OFF state. Further, the NPN transistor 50 is turned into the OFF state by timer output voltage Vt obtained from the timer 46 and having the low level, and the output voltage Vu obtained from the collector of the NPN transistor 50 has the high level to be supplied to the enable terminal 53E of the astable multivibrator 53, as shown in FIG. 2E. The astable multivibrator 53 performs the level inverting operation to cause the output voltage Vw to have the high level and the low level alternately every predetermined period set by a time constant circuit contained in the astable multivibrator 53, as shown in FIG. 2F.

The NPN transistor 54 is controlled, by the output voltage Vw having the high level and the low level alternately every predetermined period, to be put in the ON state and in the OFF state alternately every predetermined period and thereby the light emitting diode 57 is put in a condition for emitting green light and in a condition for stopping emission of green light alternately every predetermined period to perform a flashing operation for emitting green light intermittently, as shown in FIG. 2H.

As described above, in the period in which the battery 59 is recharged with the charging current IB supplied through the power source line 19 also after the degree of recharging on the battery 59 has reached eighty percent of full recharging so that the degree of recharging on the battery 59 increases gradually toward a hundred percent of full recharging, the light emitting diode 44 is caused to stop emitting red light and the light emitting diode 57 is caused to perform the flashing operation for emitting green light intermittently so that it is appropriately indicated that the battery 59 can be used for discharging to provide a power source for an electronic apparatus.

Then, at a time point t4 as shown in FIGS. 2A to 2H, the time measuring operation by the timer 46 for measuring the predetermined time which is set to correspond to the period in which the degree of recharging on the battery 59 reaches a hundred percent of full recharging after having passed through eighty percent of full recharging, is finished, and the timer output voltage Vt obtained from the timer 46 is changed to have the high level, as shown in FIG. 2D, and the NPN transistor 47 is turned into the ON state. The NPN transistor 50 is also turned into the ON state by the timer output voltage Vt having the high level and thereby the astable multivibrator 53 is caused not to perform the level inverting operation so that the NPN transistor 54 is turned into the OFF state. In such a manner, with the NPN transistor 47 turned into the ON state, the light emitting diode 57 is turned into the ON state to emit green light, as shown in FIG. 2H. The PNP transistor 41 is still in the OFF state and the light emitting diode 44 is kept in the OFF state, as shown in FIG. 2G.

After that, the battery 59 is removed from the charging terminals 30 and 31 at a time point t5 as shown in FIGS. 2A to 2H. Thereby, the charging current IB stops flowing through the power source line 19, as shown in FIG. 2B. Finally, the power source switch 14 is turned off and the light emitting diode 57 is turned into the OFF state at a time point t6 as shown in FIGS. 2A to 2H.

Figure 3:
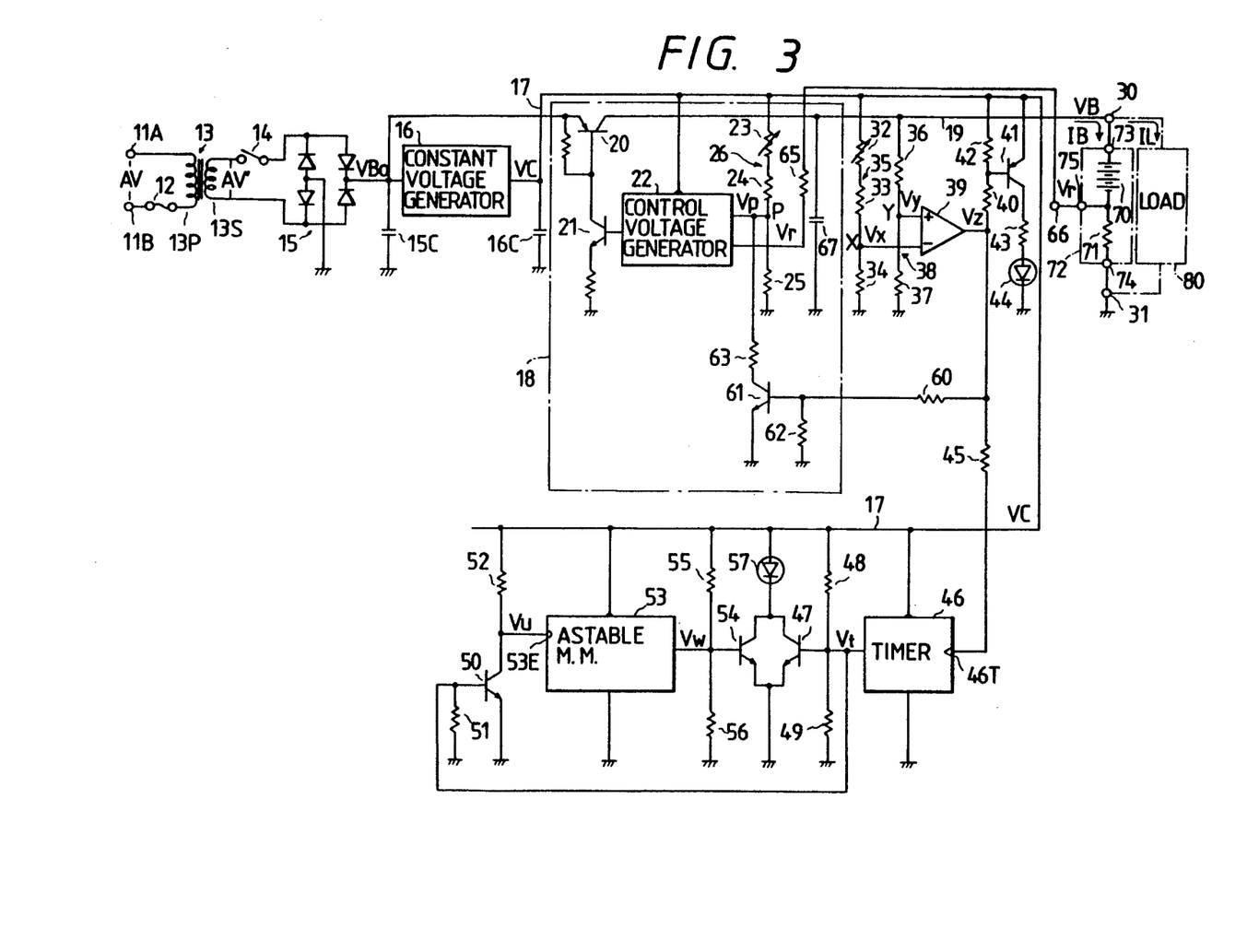
FIG. 3 is a circuit diagram showing another embodiment of battery charger according to the present invention.

FIG. 3 shows another embodiment of battery charger according to the present invention, which is constituted to be suitable for recharging a so-called Nickel-Cadmium battery, which is may be used as a secondary battery for providing a power source for an electronic apparatus, such as a portable telephone. In FIG. 3, elements and portions corresponding to those of FIG. 1 are marked with the same references and further description thereof will be omitted.

In the embodiment shown in FIG. 3, a voltage stabilizing circuit 18 comprises a PNP transistor 20, an NPN transistor 21, a control voltage generator 22, a voltage detector 26 having a connecting point P formed between resistors 24 and 25 and connected with one of input terminals of the control voltage generator 22, a resistor 65 interconnecting therethrough the other of input terminals of the control voltage generator 22 to a connecting terminal 66, and a capacitor 67 connected between the collector of the PNP transistor 20 and the grounded point.

A battery 70 which is, for example, a Nickel-Cadmium battery to be recharged and a resistor 71 having a small resistance value of, for example, about 0.3 ohms are connected in series between charging terminals 30 and 31. A connecting terminal 73 derived from the battery 70 is connected with the charging terminal 30 and a connecting terminal 74 derived from the resistor 71 is connected with the charging terminal 31. The battery 70 and the resistor 71 connected in series are contained in a case 72 attached detachably to the charging terminals 30 and 31. A terminal 75 is derived from a connecting point between the battery 70 and the resistor 71 is connected with the connecting terminal 66 derived from the voltage stabilizing circuit 18.

A charging voltage VB obtained through a power source line 19 at the charging terminal 30 is applied to the the battery 70 and the resistor 71 connected in series and thereby a charging current IB flows through the battery 70 and the resistor 71. Namely, the charging current IB is supplied through the power source line 19 to the battery 70 and the resistor 71 connected in series between the charging terminals 30 and 31 from a power source circuit constituted by a full-wave rectifier 15 and the voltage stabilizing circuit 18, so that the battery 70 is recharged with the charging current IB. When the battery 70 is thus recharged, a voltage Vr obtained across the resistor 71 through which the charging current IB flows is derived from the connecting point between the battery 70 and the resistor 71 to the terminal 75. The voltage Vr appearing at the terminal 75 varies in level in response to variations in level of the charging current IB.

The voltage Vr appearing at the terminal 75 and applied through the connecting terminal 66 and the resistor 65 to the control voltage generator 22 is compared, in the control voltage generator 22, with a voltage Vp obtained at the connecting point P in the voltage detector 26 to produce a control voltage having its level corresponding to a difference between the voltage Vr and the voltage Vp. The control voltage thus produced is supplied to the base of the NPN transistor 21 so as to control through the NPN transistor 21 the impedance of the PNP transistor 20. With such a control of the impedance of the PNP transistor 20, the voltage stabilizing circuit 18 performs as a constant voltage generating circuit and the charging voltage VB which is obtained at the collector of the PNP transistor 20 and transmitted through the power source line 19 to the charging terminal 30 is controlled to have a constant level of, for example, 8.1 volts. In such a case, the difference between the voltage Vr and the voltage Vp is controlled to be constant. Since the voltage Vp is obtained by dividing the constant power source voltage VC in the ratio of the resistance value of the resistor 25 to the sum of resistance values of a variable resistor 23 and the resistor 24 and the resistor 25 and thereby has a constant level, the voltage Vr is controlled also to have a constant level and a current flowing through the PNP transistor 20 is so controlled that the charging current IB supplied through the power source line 19 to the battery 70 and the resistor 71 connected in series is controlled to be constant. The level of the voltage Vp is adjusted by the variable resistor 23.

When the battery 70 is recharged by the battery charger constituted as described above in accordance with the present invention, the case 72 containing the battery 70 and the resistor 71 connected in series is connected between the charging terminals 30 and 31 in such a manner that the connecting terminal 73 derived from the battery 70 is connected with the charging terminal 30, the connecting terminal 74 derived from the resistor 71 is connected with the charging terminal 31 and the terminal 75 derived from the connecting point between the battery 70 and the resistor 71 is connected with the connecting terminal 66 derived from the voltage stabilizing circuit 18, and the charging current IB of, for example, 150 milliamperes is supplied through the power source line 19 to the battery 70 and the resistor 71 connected in series in almost the same manner as the charging current IB flowing through the battery 59 in the embodiment shown in FIG. 1.

When the charging voltage VB on the power source line 19 increases gradually with increase in the degree of recharging on the battery 70, the voltage Vr obtained across the resistor 71 is supplied through the connecting terminal 66 and the resistor 65 to the control voltage generator 22, and the PNP transistor 20, the impedance of which is controlled by the control voltage supplied from the control voltage generator 22, is operative to control the current flowing through the power source line 19 so as to keep the voltage Vr constant, namely, to keep the charging current IB flowing through the battery 70 and the resistor 71 constant, so that the battery 70 is recharged with the charging current IB which is kept to have the constant level of, for example, 150 milliamperes.

Under a condition in which the battery 70 is recharged with the charging current IB as described above, light emitting diodes 44 and 57 constituting first and second recharging indicators, respectively, are operative to perform indication in response to the recharging of the battery 70 in the same manner as those in the embodiment shown in FIG. 1.

When a load 80, such as a portable telephone, is connected in parallel with the series connection of the battery 70 and the resistor 71, as shown with a dot-dash line in FIG. 3, in accordance with the first and second recharging indicators which indicates that the battery 70 can be used for discharging to provide a power source for an electronic apparatus, a current IL having its level of, for example, about 60 milliamperes are supplied through the power source line 19 to the load 80. Accordingly, the current IL having its level of, for example, about 60 milliamperes flows through the power source line 19 in addition to the charging current IB having the level of, for example, 15 milliamperes and supplied to the battery 70 and the resistor 71 connected in series. In such a case, the charging current IB is maintained to have the constant level regardless of variations in level of the current IL supplied to the load 80, under the control of the impedance of the PNP transistor 20 so as to keep the voltage Vr obtained across the resistor 71 by the control voltage supplied from the control voltage generator 22 to which the voltage Vr is applied.

With the embodiment shown in FIG. 3 operating as described above, other advantages which are the same as those obtained with the embodiment shown in FIG. 1 are also obtained.

What is claimed is:

1. A battery charger comprising:
    a pair of charging terminals to which both end terminals of a secondary battery are connected, respectively,
    power source means for supplying the secondary battery connected to said charging terminals with a substantially constant charging current in a first time period and for supplying a substantially constant charging voltage to the secondary battery in a second time period,
    recharging detecting means for detecting the degree of recharging on the secondary battery to which the charging current is supplied from said power source means on the strength of a voltage between said charging terminals,
    timer means for measuring a predetermined time commencing when said recharging detecting means detects that the degree of recharging on the secondary battery supplied with the charging current from said power source means has reached a predetermined degree, said predetermined degree being within a range from seventy percent to ninety percent of full recharging,
    first recharging indicator means for indicating when said constant charging current is being supplied to the secondary battery connected to said charging terminals during said first time period, and
    second recharging indicator means different in appearance from said first indicator means for indicating when said timer means measures said predetermined time,
    whereby said first recharging indicator means and said second recharging indicator means indicate when the degree of recharging on the secondary battery has reached said predetermined degree.

2. A battery charger according to claim 1, wherein said power source means comprises a rectifier for rectifying an alternating current voltage to produce a direct current voltage and a voltage stabilizing circuit for stabilizing the direct current voltage produced by said rectifier to produce a stabilized power source voltage and applying the stabilized power source voltage between said charging terminals to produce the charging current supplied to the secondary battery.

3. A battery charger according to claim 2, wherein said voltage stabilizing circuit comprises a transistor to which said direct current voltage produced by said rectifier is supplied and a control voltage producing circuit portion for generating a control voltage for controlling impedance of said transistor to obtain the stabilized power source voltage from said transistor.

4. A battery charger according to claim 3, wherein said power source means further comprises a constant voltage generator for generating, based on the direct current voltage produced by said rectifier, a constant power source voltage wherein said control voltage producing circuit portion is supplied with both the stabilized power source voltage obtained from said transistor and the constant power source voltage generated by said constant voltage generator.

5. A battery charger according to claim 1, wherein said recharging detecting means comprises a voltage detector for detecting a level of the voltage between said charging terminals and a level comparator for comparing the level detected by said voltage detector with a predetermined reference level.

6. A battery charger according to claim 5, wherein said power source means comprises a rectifier for rectifying an alternating current voltage to produce a direct current voltage, a voltage stabilizing circuit for stabilizing the direct current voltage produced by said rectifier to produce a stabilized power source voltage and applying the stabilized power source voltage between said charging terminals to produce the charging current supplied to the secondary battery, and a constant voltage generator for generating based on the direct current voltage produced by said rectifier a constant power source voltage, and said recharging detecting means further comprises an additional voltage detector for detecting a level of the constant power source voltage generated by said constant voltage generator to produce the predetermined reference level.

7. A battery charger according to claim 6, wherein said voltage detector comprises a first voltage divider for dividing the stabilized power source voltage to produce a first voltage, wherein said additional voltage detector comprises a second voltage divider for dividing the constant power source voltage to produce a second voltage, and whereby said level comparator compares the first voltage with the second voltage and produces a comparison output.

8. A battery charger according to claim 1, wherein each of said first and second recharging indicator means comprises a light emitting diode, a switching device connected with the light emitting diode, and a control circuit for controlling said switching device to be selectively put in an ON state and an OFF state.

9. A battery charger according to claim 8, wherein said first and second recharging indicator means comprise first and second light emitting diodes of different colors.

10. A battery charger according to claim 1, wherein a resistor is further connected in series with the secondary battery between said recharging terminals and said voltage stabilizing circuit is supplied with a voltage obtained across said resistor, said voltage stabilizing circuit controlling the charging current supplied to the secondary battery so that the voltage obtained across the resistor is kept substantially constant.

* * * * *